United States Patent [19]
Kobayashi et al.

[11] Patent Number: 5,760,346
[45] Date of Patent: Jun. 2, 1998

[54] VIBRATION SENSING DEVICE

[75] Inventors: Katsuyuki Kobayashi, Yokohama; Atsushi Tanaka, Yamato; Yuichiro Yoshimura, Kamakura; Ryozo Yanagisawa, Chiba-ken; Masaki Tokioka, Fujisawa; Hajime Sato, Yokohama, all of Japan

[73] Assignee: Canon Kabushiki Kaisha, Tokyo, Japan

[21] Appl. No.: 674,740

[22] Filed: Jul. 2, 1996

[30] Foreign Application Priority Data

Jul. 5, 1995 [JP] Japan ................... 7-169777

[51] Int. Cl.⁶ .................. G08C 21/00; G09G 3/02
[52] U.S. Cl. .................. 178/18; 178/19; 345/177
[58] Field of Search .................. 178/18, 19, 20; 345/173, 175, 176, 177, 179

[56] References Cited

U.S. PATENT DOCUMENTS

| | | | |
|---|---|---|---|
| 4,886,943 | 12/1989 | Suzuki | 178/18 |
| 5,352,856 | 10/1994 | Tanaka et al. | 178/18 |
| 5,362,930 | 11/1994 | Yoshimura et al. | 178/18 |
| 5,410,612 | 4/1995 | Arai et al. | 382/13 |
| 5,484,967 | 1/1996 | Yanagisawa | 345/177 |
| 5,539,160 | 7/1996 | Tokioka et al. | 128/19 |
| 5,541,370 | 7/1996 | Matsuda | 178/20 |
| 5,561,613 | 10/1996 | Kobayashi | 178/18 |

FOREIGN PATENT DOCUMENTS

| | | |
|---|---|---|
| 582283A1 | 2/1994 | European Pat. Off. . |
| 649116A1 | 4/1995 | European Pat. Off. . |
| 2-251754 | 10/1990 | Japan . |
| 5-189131 | 7/1993 | Japan . |

*Primary Examiner*—Steven Saras
*Assistant Examiner*—Vijay Shankar
*Attorney, Agent, or Firm*—Fitzpatrick, Cella, Harper & Scinto

[57] ABSTRACT

There is provided a highly precise coordinate input device not requiring a particular designating tool. A sheet, composed of a piezoelectric plate polarized in the direction of thickness, is superposed with a vibration transmitting plate, provided with vibration sensors in predetermined positions. The sheet generates vibration by a pulse signal generated by a sheet driver. When the sheet is pressed for example with a pen, the vibration is transmitted to the vibration transmitting plate from the pressed position, and is detected by the vibration sensors. A controller calculates the distance between the vibration input point and the vibration sensor, based on the delay time from the start of vibration to the detection. This operation is conducted for the plural sensors, and the coordinate is calculated from thus calculated distances.

36 Claims, 7 Drawing Sheets

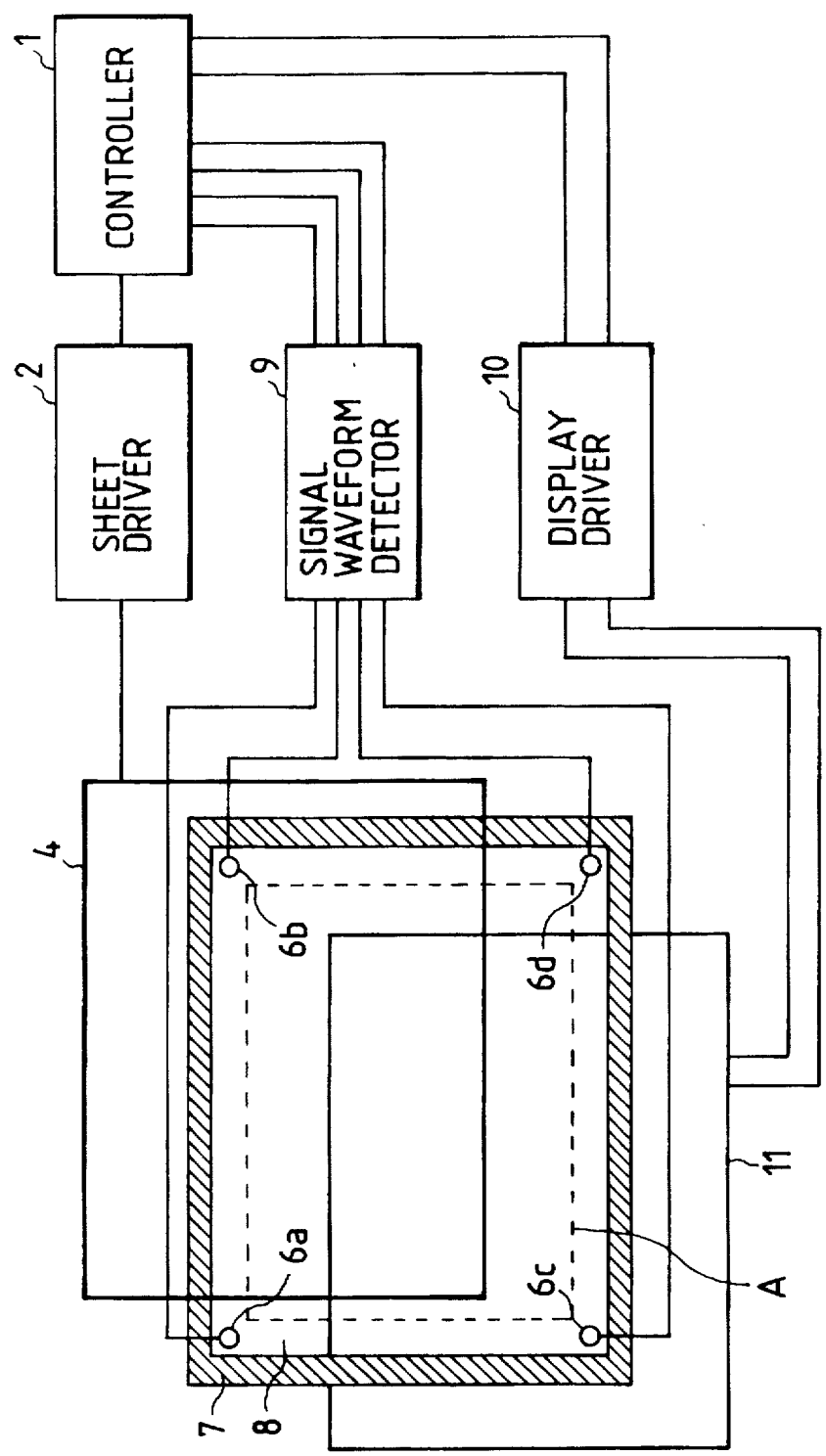

VIBRATION SENSING DEVICE

BACKGROUND OF THE INVENTION

1. Field of the Invention

The present invention relates to a device for detecting an elastic vibration by plural sensors provided on a vibration transmitting plate and detecting the coordinate of the position of vibration input based on the transmitting time of such elastic vibration.

2. Related Background Art

For determining the coordinate, there are already known various methods, such as the resistive film method, the electromagnetic induction method, the electrostatic coupling method, the ultrasonic wave method. The resistive film method allows the input for example with a finger, not requiring an exclusive input pen, but is inferior to the latter three methods in the precision of the coordinate calculation. On the other hand, the electromagnetic induction method and the electrostatic coupling method are superior to the resistive film method in the precision of the coordinate calculation, but necessitates an exclusive input pen, thus not allowing the input with a finger and is expensive in cost.

On the other hand, within the method utilizing the ultrasonic wave, there is known, for example, a coordinate input device for detecting the vibration with plural vibration detecting means provided on a vibration transmitting plate, and detecting the transmission time of the vibration wave from the vibrating pen to each vibration detecting means, thereby determining the position of the vibrating pen. In such coordinate input device, the coordinate is calculated by detecting the Lamb wave propagating in the vibration transmitting plate, based on a delay time tg relating to the group velocity Vg of the vibration and a delay time tp relating to the phase velocity Vp of the vibration. This method allows the coordinate input a higher precision in comparison with the resistive film method, and is more advantageous in cost, because of its simpler configuration, in comparison with the electromagnetic induction method and the electrostatic coupling method.

There is also proposed a method of calculating the coordinate by driving a vibrator driving circuit of the vibration input pen in a state not synchronized with the calculation control circuit. This method can provide an input device with good operability, without the signal cable between the input pen and the main body of the device.

However, the above-mentioned conventional input devices utilizing the ultrasonic wave have been associated with the following drawbacks.

The input pen for entering the coordinate has to be an exclusive pen involving a mechanism for generating the vibration. Consequently the input for example with a finger cannot be realized.

Also the ultrasonic method capable of eliminating the connecting cable still requires an exclusive pen for generating the vibration, and such exclusive pen has to be provided with a circuit for generating the vibration, a battery as the power source etc. Thus, in consideration of the running cost of the battery, such exclusive pen is inferior to the pressure input method (for example input with finger or with a pen-shaped utensil with a pointed end).

In consideration of the foregoing, the present invention is to provide a coordinate input device which can realize a high precision without an exclusive coordinate indicating utensil, and which can be manipulated for example with a finger.

SUMMARY OF THE INVENTION

An object of the present invention, in an embodiment thereof, is to provide a coordinate input device comprising:

a vibration member for generating vibration;

a vibration transmitting member laminated with the vibration member and adapted to transmit the vibration from a vibration input point; and calculation means for detecting the vibration at predetermined positions of the vibration transmitting member, and calculating the coordinate of the vibration input point by measuring the delay time from the input of the vibration at the vibration input point to the detection of the vibration.

BRIEF DESCRIPTION OF THE DRAWINGS

FIG. 7 is a block diagram showing the configuration of a second embodiment.

DESCRIPTION OF THE PREFERRED EMBODIMENTS

[First Embodiment]

Now the present invention will be clarified in detail by preferred embodiments thereof, with reference to the attached drawings.

Figure 1:
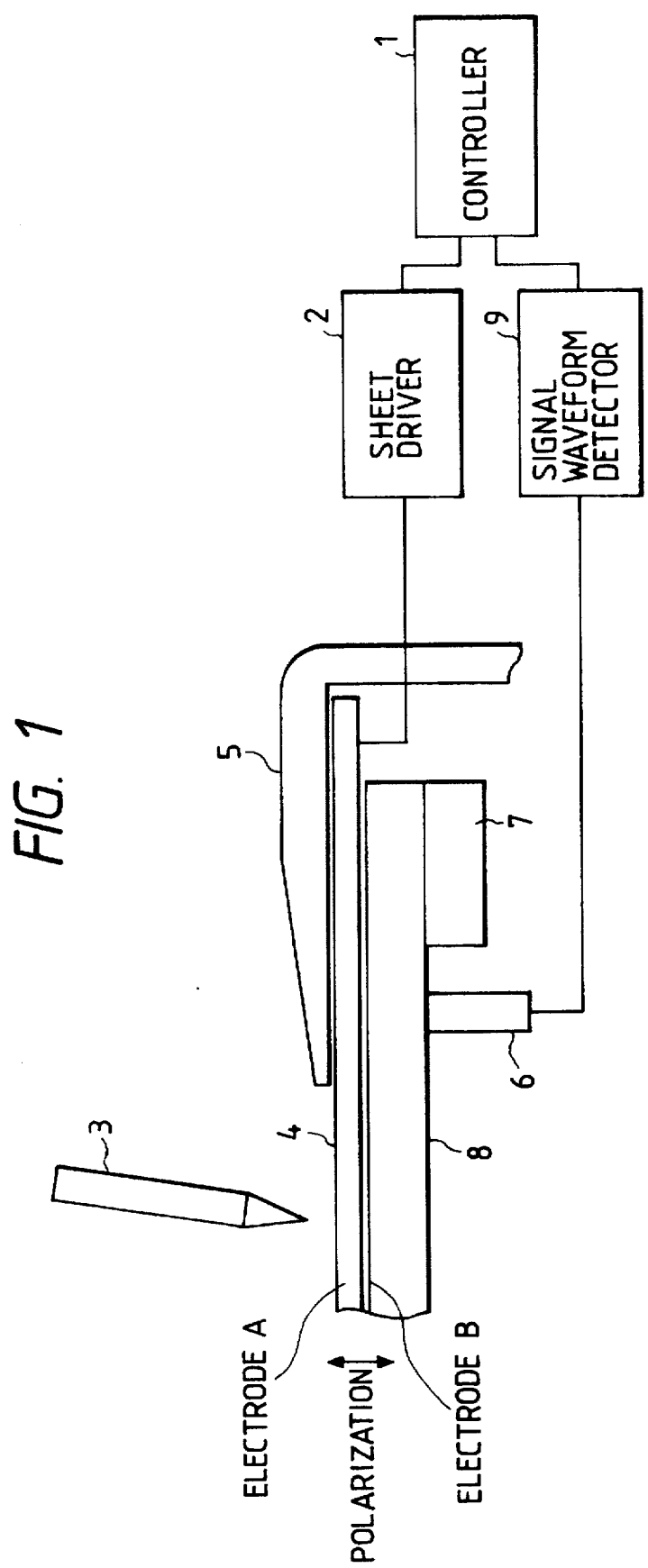
FIG. 1 is a view best representing the configuration of an embodiment of the present invention.

At first reference is made to FIG. 1 for explaining the entire configuration of the coordinate input device embodying the present invention. A controller 1 controls the entire device and also calculates the coordinate position. A sheet driver 2 causes a vibration in a piezoelectric sheet layer 4. The sheet 4 in the present embodiment is composed of piezoelectric ceramics (such as PZT), is polarized in the direction of thickness of the sheet, and has electrodes, on both faces of the sheet, for generating vibration in the sheet. A uniform vibration is induced in the direction of thickness of the sheet 4, by driving the sheet 4 with the sheet driver 2. An efficient conversion into the vibration can be realized by matching the vibration frequency of the sheet 4 with the resonance frequency in the direction of thickness of the sheet 4. In the present embodiment, the vibration frequency of the sheet 4 is so selected as to generate a Lamb wave in a propagation layer 8, but other vibration modes may naturally be employed also.

The propagation layer 8, for transmitting the vibration, is composed of a metal or an alloy such as aluminum, iron or copper, and, when the sheet 4 and the propagation layer 8 are brought into mutual contact by a pressure with a finger or a pen-shaped tool (not shown), the vibration generated in the sheet 4 is transmitted to the propagation layer 8. In the present embodiment, the sheet 4 and the propagation layer 8 are provided in a mutually contacting relationship, but, even in such arrangement, the sheet 4 and the propagation layer 8 are acoustically insulated by an air layer, so that the vibration generated in the sheet 4 is not transmitted to the propagation layer 8 unless the sheet 4 is pressed with a sufficient pressure to the propagation layer 8. Stated differently, the level of the vibration (signal) entered with a sufficient pressure is sufficiently different from the level of the vibration (noise) entered by the contacting arrangement of the two, so that the performance of the device of the present invention is not at all affected by such arrangement. It is naturally possible also to adopt a configuration of intentionally forming a gap between the sheet 4 and the propagation layer 8 to form an air layer therebetween or to form, between the sheet 4 and the propagation layer 8, an intermediate layer which does not transmit the acoustic wave in the ordinary state but transmit such acoustic wave from the sheet 4 to the propagation layer 8 only under a pressure for the coordinate input.

An upper case 5 constitutes a part of the outer casing and defines an effective area for the coordinate input.

The vibration generate in the sheet 4, when entered into the propagation layer 8, propagates therein and is reflected at the end face of the propagation layer 8. Thus, in order to avoid (attenuate) the reflection of the vibration toward the central area, an anti-vibration member 7 is provided on the outer periphery of the propagation layer 8. Also in the peripheral area of the propagation layer 8, there are fixed plural vibration sensors for converting mechanical vibration into electric signals, such as piezoelectric elements. The signals from the vibration sensors 6 are amplified by an amplifying circuit, not shown, and then supplied to a signal waveform detector 9 for signal processing, of which result is supplied to the controller 1 for the coordinate calculation. The details of the signal waveform detector 9 and the controller 1 will be explained later.

The piezoelectric sheet 4 is driven by the sheet driver 2. The driving signal for the sheet 4 is supplied from the controller 1 in the form of a low-level pulse signal, which is amplified with a predetermined gain in the sheet driver 2 and then applied to the sheet 4. The drive signal is for example composed of an alternating voltage of 500 kHz, applied with a sampling frequency of 100 kHz. The electrical drive signal is converted by the sheet 4 into a mechanical ultrasonic vibration, which is transmitted to the propagation layer 8 when the sheet 4 and the propagation layer 8 are brought into mutual contact under a sufficient pressure.

Though the present embodiment employs plural sensors 6 for detecting the vibration, the following description will be given only for a single sensor, for the purpose of simplicity.

(Controller)

In the configuration explained above, the controller 1 releases a signal, at a predetermined interval (for example 5 ms) for causing the sheet driver 2 to drive the sheet 4, and starts time counting by an internal timer (composed of a counter). When the sheet 4 is contacted with the propagation layer 8 with a sufficient pressure, the vibration generated in the sheet 4 is transmitted to the propagation layer 8. The contacting point of the sheet 4 and the propagation layer 8 is defined as the vibration input point. The vibration entered into the propagation layer 8 is detected by the vibration sensor 6, after a delay corresponding to the distance from the vibration input point to the vibration sensor 6.

The vibration waveform detector 9 detects the signal from the vibration sensor 6 and generates a signal indicating the timing of arrival of the vibration to each vibration sensor through a waveform detecting process to be explained later, and, in response to this signal, the controller 1 detects the vibration transmitting time to the vibration sensor 6. The coordinate position of the vibration input point is calculated, based on the vibration transmitting times from the plural vibration sensors and through a process to be explained later.

Figure 2:
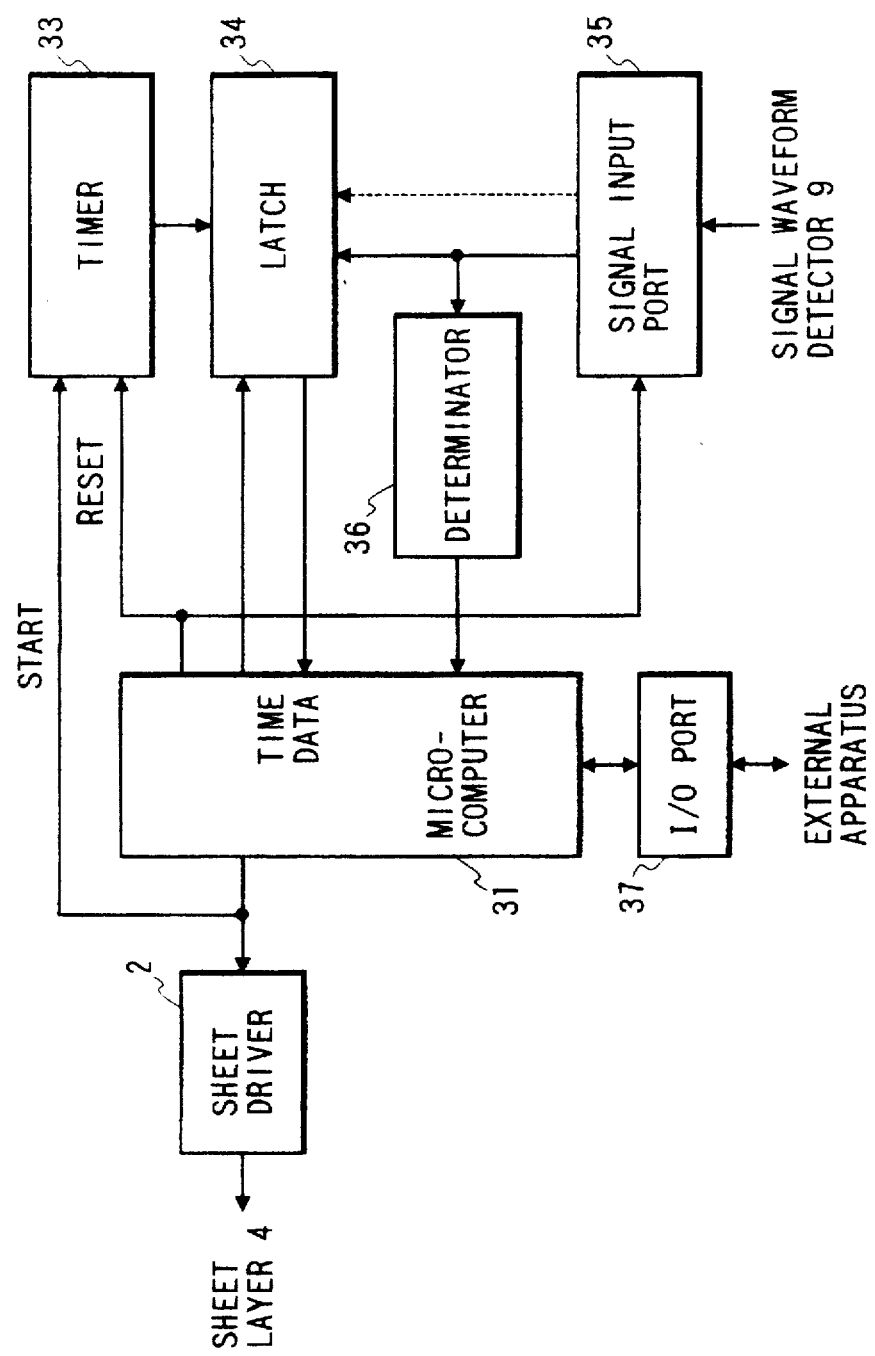
FIG. 2 is a block diagram showing the internal configuration of a control circuit.

FIG. 2 is a schematic block diagram of the controller 1 of the present embodiment, and the components and functions of the controller 1 will be explained in the following.

A microcomputer 31 controls the controller 1 and the entire coordinate input device, and is provided with an internal counter, a ROM storing the control sequence, a RAM used for the calculation, a non-volatile memory for storing constants etc. A timer 33 is composed for example of a counter for counting reference clock signals, not shown, and starts time counting in response to the entry of a start signal into the sheet driver 2 for initiating the drive of the sheet 4. In this manner the start of the time counting can be synchronized with the detection of the vibration by the vibration sensors 6, and there can be measured the vibration transmitting time until the vibration is detected by the vibration sensor 6.

The vibration arrival timing signal released from the vibration waveform detector 9 and indicating arrival of the vibration at the vibration sensor 6 is supplied through a detection signal input port 35 to a latch 34, which in response latches the time count of the timer 33. A determinator 36, upon discriminating the reception of the detection signal, sends a corresponding signal to the microcomputer 31. As there are plural vibration sensors in practice, the latch is adapted to latch the time counts corresponding to the vibration arrival timing signals from such plural vibration sensors, and the determinator 36 judges the reception of the detection signals from all the sensors required for the coordinate calculation.

In response to the signal from the determinator 36, the microcomputer 31 reads, from the latch 34, the transmission delay times to the vibration sensors, then calculates the coordinate position of the vibration input point on the propagation layer 8 through a predetermined calculation, and releases thus obtained coordinate information to an external equipment through an I/O port 37.

(Detection of Transmission Delay Time of Vibration (FIGS. 3 and 4))

Figure 3:
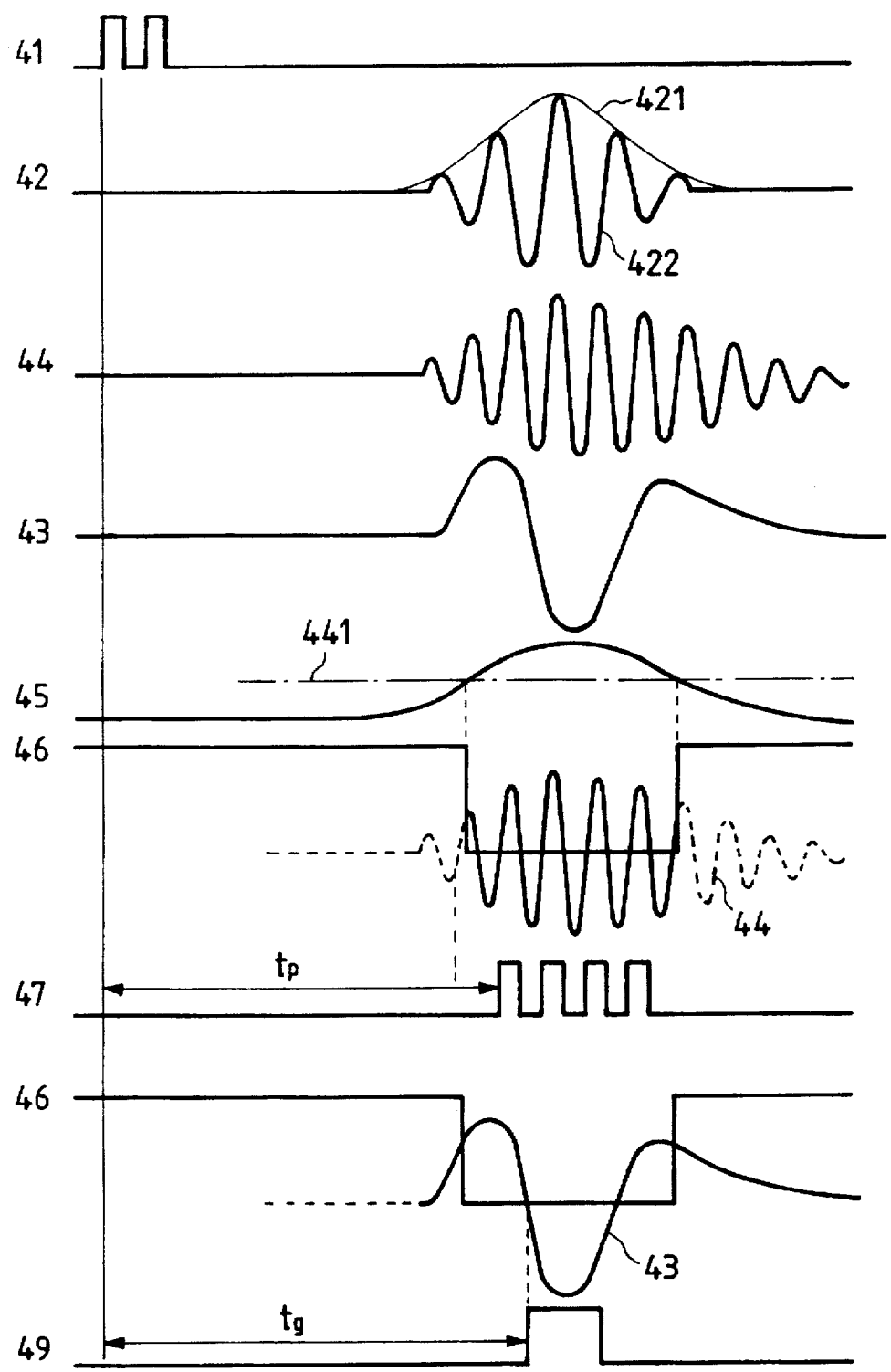
FIG. 3 is a timing chart of the signal processing.

FIG. 3 is a view showing the detected waveform supplied to the signal waveform detector 9 and the process of measuring the vibration transmitting time based thereon.

As already explained in the foregoing, the measurement of the transmission delay time of the vibration to the vibration sensor 6 is started simultaneously with the supply of the start signal to the sheet driver 2. At this point, a drive signal 41 is supplied to the sheet 4 from the sheet driver 2. In response to the signal 41, the ultrasonic vibration transmitted from the sheet 4 to the propagation layer 8 at the vibration input point propagates to the vibration sensor 6 within a time corresponding to the distance thereto and is detected by the vibration sensor 6. A signal 42 in FIG. 3 indicates the signal waveform detected by the vibration sensor 6.

As explained in the foregoing, the vibration employed in the present embodiment is Lamb wave, in which the propagating velocity of the envelope 421 of the detected waveform (group velocity Vg) is different from that of the phase 422 (phase velocity Vp). Consequently, the relationship between the envelope 421 and the phase 422 of the detected waveform varies depending on the propagating distance in the propagation layer 8. In the present embodiment, the distance between the vibration input point and the vibration sensor 6 is detected from a group delay time tg based on the group velocity Vg and a phase delay time tp based on the phase velocity Vp.

Figure 4:
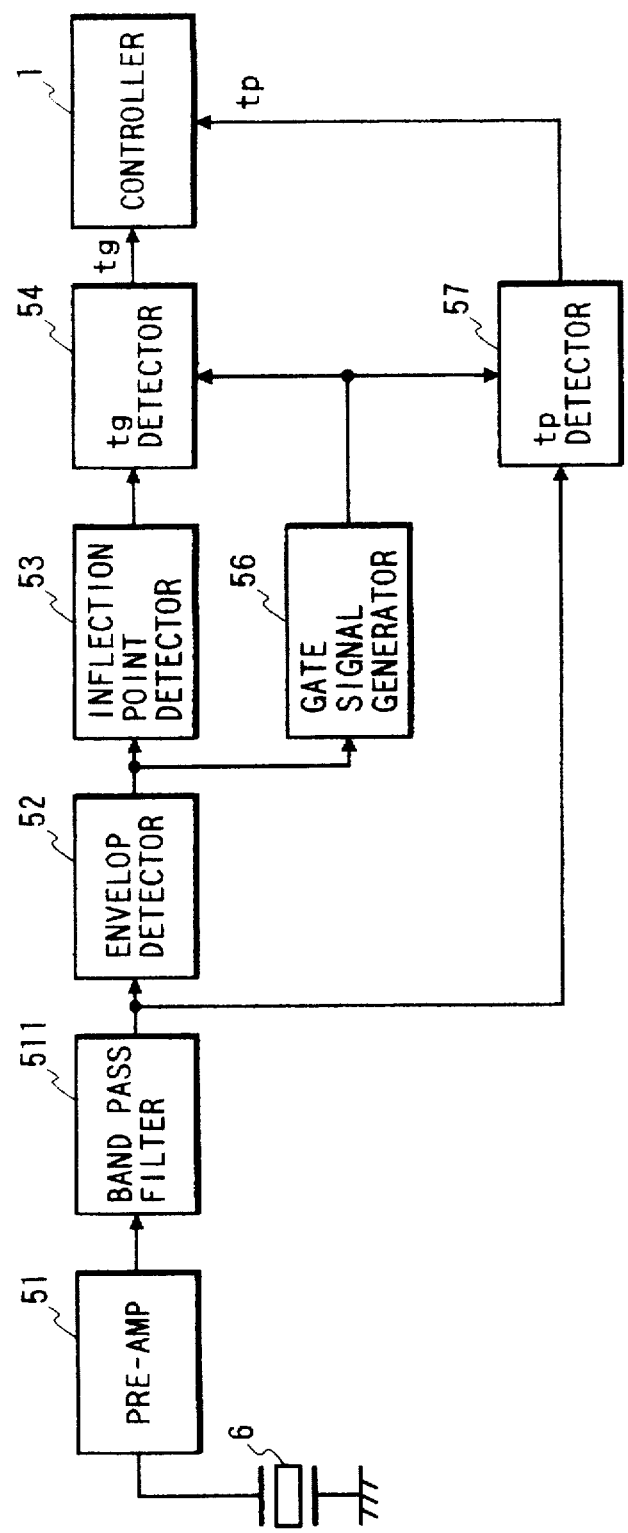
FIG. 4 is a block diagram of a signal detection circuit.

FIG. 4 is a block diagram of the vibration waveform detector 9. In the following there will be explained a configuration for detecting the group delay time tg and the phase delay time tp for each vibration sensor, with reference to FIGS. 3 and 4.

The output signal 42 of the vibration sensor 6 is amplified by a pre-amplifier 51 to a predetermined level, and is subjected to the removal of unnecessary frequency components by a band pass filter 511 to provide a signal 44. The envelope of the waveform of this signal propagates with the group velocity Vg, and the delay time tg relating to the group velocity Vg can be obtained by detecting a particular point on this waveform, such as the peak or the inflection point of the envelope. Thus the signal obtained through the pre-amplifier 51 and the band pass filter 511 is supplied to an envelope detector 52, composed for example of an absolute value circuit and a low pass filter, to obtain the envelope 45 only of the detected signal. Then a gate signal generator 56, composed for example of a multivibrator, forms a gate signal 46, corresponding to a period where the envelope 45 exceeds a predetermined threshold level 441.

As explained above, the group delay time tg relating to the group velocity Vg can be obtained by detecting the peak or the inflection point of the envelope. The present embodiment utilizes the detection of a first inflection point of the envelope (downshift zero-cross point of a signal 43 to be explained later). For this purpose the signal 45 released from the envelope detector 52 is supplied to an envelope inflection point detector 53 to obtain a twice differentiated waveform 43, which is compared with the above-mentioned gate signal, whereby a tg signal detector 54, composed for example of a multivibrator, generates a tg signal 49 having a predetermined waveform and constituting a detection signal indicating the envelope delay time, for supply to the controller 1.

On the other hand, the phase delay time tp relating to the phase velocity Vp is detected in the following manner. A tp signal detector 57, composed for example of a zero-cross comparator or a multivibrator, for detecting the phase delay time tp, detects the first upshift zero-cross point of the phase signal 44 during the presence of the gate signal 46, thereby providing a signal 47 indicating the phase delay time tp to the controller 1.

The foregoing description is limited to the case of a single sensor, but there may be provided same circuits corresponding to the plural sensor, or a single circuit may be commonly utilized for the plural sensors on time-sharing basis utilizing for example an analog switch.

(Calculation of Distance Between the Vibrating Pen and Sensor (FIG. 5))

The distance from the vibrating pen to each vibration sensor is calculated, from thus obtained group delay time tg and phase delay time tp, in the following manner.

Figure 5:
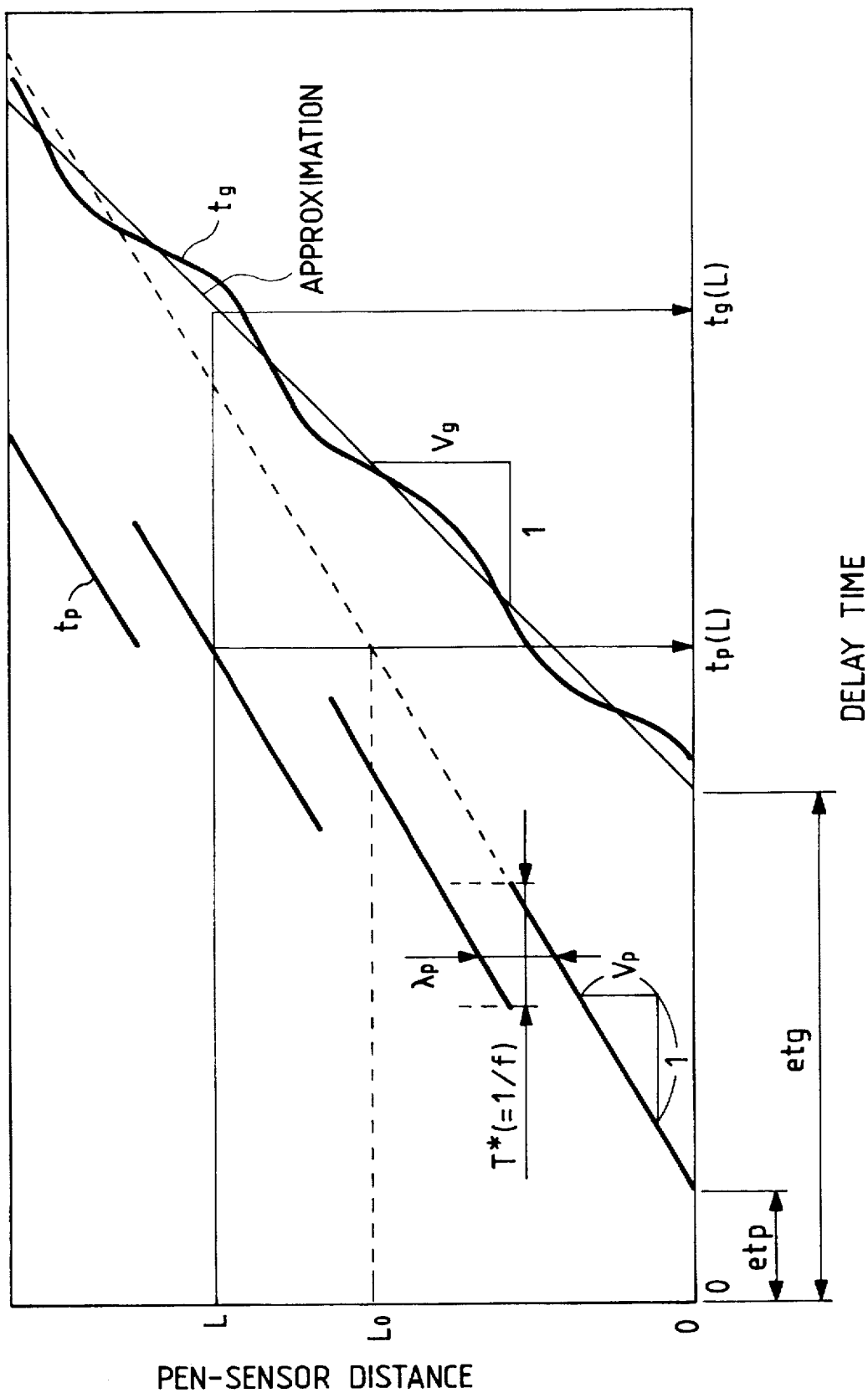
FIG. 5 is a chart showing the relationship between the distance from the vibration input point to the sensor and the delay time.

FIG. 5 is a chart schematically showing the relationship between the group delay time tg or the phase delay time tp and the pen-sensor distance L. As the present embodiment employs the Lamb wave for detection, the group delay time tg does not necessarily show satisfactory linearity. Consequently the distance L between the vibration input point and the vibration sensor 6 cannot be determined with a high precision when it is calculated as the product of the group delay time tg and the group velocity Vg as in the equation (1):

$$L = Vg \cdot tg \quad (1)$$

The coordinate can be determined with a higher precision according to the equation (2) employing the phase delay time tp of superior linearity:

$$L = Vp \cdot tp + n \cdot \lambda p \quad (2)$$

wherein $\lambda p$ is the wavelength of the elastic wave, and n is an integer. In the equation (2), the first term in the right-hand side indicates the distance L0 in FIG. 5, and the difference between the distance L to be determined and the distance L0 is evidently an integral multiple of the wavelength $\lambda p$ as shown in FIG. 5. Referring to FIG. 5, the width T* of a step on the time axis corresponds to a cycle of the waveform 44, so that there stands a relation T*=1/(frequency). Also represented in the distance, the step width corresponds to the wavelength $\lambda p$. Consequently the distance between the pen and the sensor can be determined precisely by determining the integer n. Based on the equations (1) and (2), the above-mentioned integer n can be determined from the following equation (3):

$$n = [(Vg \cdot tg - Vp \cdot tp)/\lambda p + 1/N] \quad (3)$$

wherein N is a non-zero real number which can be selected suitably. For example, by selecting N=2, n can be determined exactly even if the linearity of the group delay time tg is not good, as long as the error thereof is within ½ of the wavelength. By substituting n, determined as explained above, into the equation (2), the distance L between the vibration input point and the vibration sensor 6 can be measured in precise manner.

These equations relate to one of the vibration sensors 6, but the distances between the vibration input point and other plural vibration sensors can also be determined according to the same equations.

(Correction for Circuit Delay Time)

The transmission delay time latched by the aforementioned latch contains not only the time required for the transmission of the vibration but also a phase circuit delay time etg and a group circuit delay time etp in the circuit (cf. FIG. 5). These delay times are always present in the same amounts in the measurement of transmission of the vibration.

Figure 6:
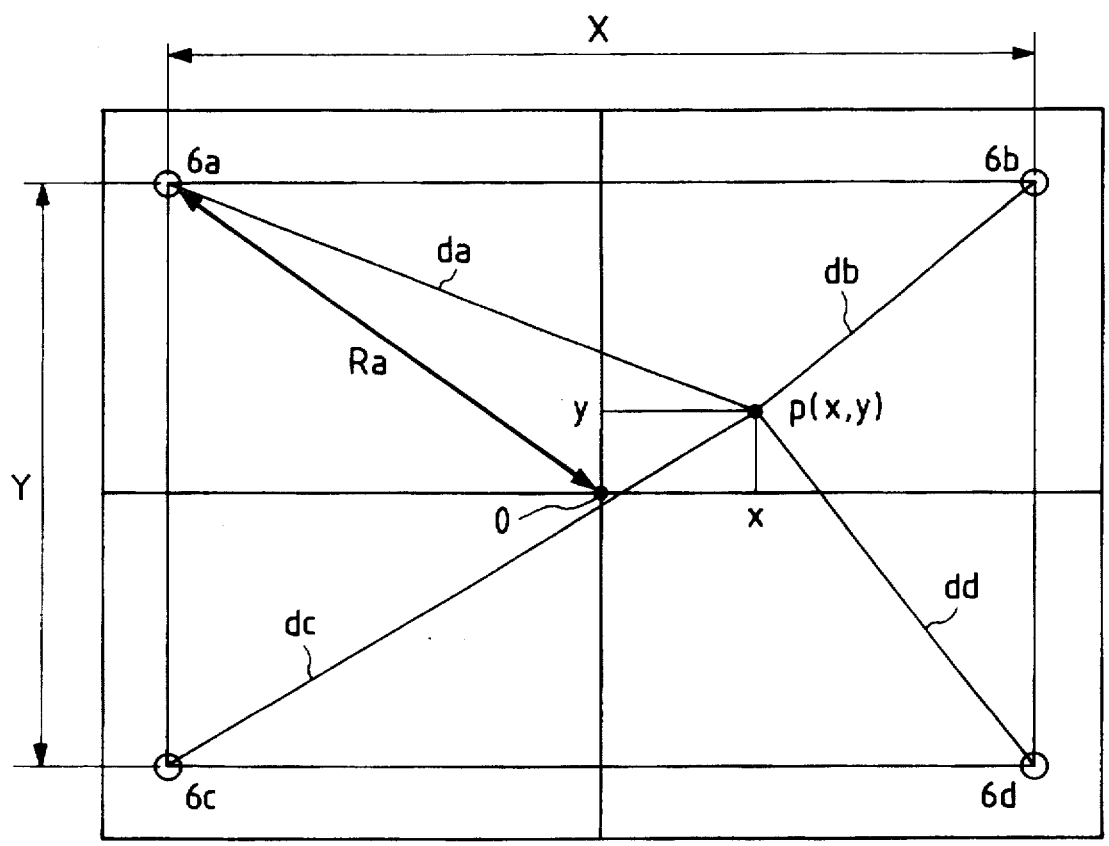
FIG. 6 is a schematic view showing the principle of coordinate calculation.

Therefore, as shown in FIG. 6, the coordinate input device is constructed by fixing four vibration sensors 6a–6d at the corners of a rectangular propagation layer 8. The distance from the original point 0 to for example the vibration sensor 6a is represented by Ra $(=\sqrt{\{(X/2)^2+(Y/2)^2\}}$, wherein a^b indicates a to the power of b (cf. FIG. 6)). By entering the vibration at the original point 0 and taking the group delay time and the phase delay time measured in the vibration sensor 6a respectively as tg0*, tp0*, and also taking the transmission times actually required by the vibration for propagating from the original point 0 to the sensor 6a in the propagation layer 8 as tg0, tp0, there stand relations:

$$tg0^* = tg0 + etg \quad (4)$$

$$tp0^* = tp0 + etp \quad (5)$$

On the other hand, the measured values at an arbitrary input point P are given in a similar manner by:

$$tg^* = tg + etg \quad (6)$$

$$tp^* = tp + etp \quad (7)$$

By calculating the differences between the equations (4) and (6) and between the equations (5) and (7), there are obtained:

$$tg^* - tg0^* = (tg + etg) - (tg0 + etg) = tg - tg0 \quad (8)$$

$$tp^* - tp0^* = (tp + etp) - (tp0 + etp) = tp - tp0 \quad (9)$$

In this manner the phase circuit delay time etp and the group circuit delay time etg contained in the vibration transmitting time can be eliminated, and the real difference in the transmission delay times between the original point 0 and the input point P, observed from the position of the sensor 6a. Also the difference in distance can be determined by applying the foregoing equations (1), (2) and (3). More specifically the distance between the vibration input point and the vibration sensor 6a can be exactly determined by calculating the distance according to:

$$tg = tg^* - tg0^* \quad (10)$$

$$tp = tp^* - tp0^* \quad (11)$$

and also employing the equations (1), (2) and (3) and adding the distance from the vibration sensor 6a to the original point 0 to thus calculated value. Consequently the distance between the vibration input point and the vibration sensor 6a can be determined by storing the distance between the vibration sensor 6a and the original point 0 for example in a non-volatile memory in advance. The same principle is applicable also to other vibration sensors 6b–6d.

(Calculation of Coordinate Position (FIG. 6))

In the following there will be explained the principle of detection of the coordinate position of the vibration input point on the propagation layer 8. By providing four vibration sensors 6a–6d at the four corners of the propagation layer 8, as shown in FIG. 6, the linear distances da–dd from the vibration input point P to the vibration sensors 6a–6d can be determined according to the above-explained principle. Also the controller 1 can determine the coordinate (x, y) of the vibration input point P from these linear distances da–dd, according to the following equations based on the law of three squares:

$$x = (da + db) \cdot (da - db)/2X \quad (12)$$

$$y = (da + dc) \cdot (da - dc)/2Y \quad (13)$$

wherein X (capital) and Y (capital) are the distances between the vibration sensors 6a and 6b and between the vibration sensors 6c and 6d. In this manner the coordinate of the vibration input point can be detected on real-time basis.

The foregoing calculation employs distance information to the three sensors, but, in the present embodiment there are provided four sensors, and the distance information of the remaining sensor is utilized for confirming the certainty of the obtained coordinate. It is also possible to discard the distance information of the sensor showing the largest pen-sensor distance L (a larger distance L lowers the signal level and increases the probability of noise interference) and to calculate the coordinate with the distances of the remaining three sensors. Though the present embodiment has four sensors and utilizes three for the calculation of the coordinate, but geometrically the coordinate calculation is possible two sensors at minimum. Thus the number of the sensors is determined according to the specification of the product.

The coordinate input device constructed as explained in the foregoing enables highly precise calculation of the coordinate of the vibration input position. Also the use of the sheet 4 constituting the input plane as the vibration source enables the input of coordinate with a finger or an ordinary pen, instead of a particular coordinate designating device.

[Second Embodiment]

The structure of a coordinate input device, constituting a second embodiment, will be explained with reference to FIG. 7.

A controller 1 controls the entire device and also calculates the coordinate position. A sheet driver 2 generates vibration in a piezoelectric sheet 4. A propagation layer 8, transmitting the vibration, is composed of a transparent member, such as of glass or acrylic resin. When sheet 4 and the propagation layer 8 are brought into mutual contact by a pressure applied by an unrepresented finger or a pen-shaped utensil 3, the vibration generated in the sheet 4 is entered into the propagation layer 8.

In the present embodiment, the sheet 4 is composed of a piezoelectric transparent polymer film such as of polyvinylidene fluoride (PVDF) and is provided with transparent electrodes on both faces, wherein the vibration is generated by the application of an AC voltage of 500 kHz with a sampling frequency of 100 kHz.

The vibration generated in the sheet 4, when entered into the propagation layer 8, propagates therein and is reflected at the end face of the propagation layer 8. Thus, in order to avoid (attenuate) the reflection of the vibration toward the central area, an antivibration member 7 is provided on the outer periphery of the propagation layer 8. Also in the peripheral area of the propagation layer 8, there are fixed plural vibration sensors for converting mechanical vibration into electric signals, such as piezoelectric elements. The signals from the vibration sensors 6 are amplified by an amplifying circuit, not shown, and then supplied to a signal waveform detector 9 for signal processing, of which result is supplied to the controller 1 for coordinate calculation. The details of the signal waveform detector 8 and the controller 1 are already explained in the first embodiment.

The piezoelectric sheet 4 is driven by the sheet driver 2. The driving signal for the sheet 4 is supplied from the controller in the form of a low-level pulse signal, which is amplified with a predetermined gain in the sheet driver 2 and then applied to the sheet 4. The drive signal is for example composed of an alternating voltage of 500 kHz, applied with a sampling frequency of 100 kHz. The electrical drive signal is converted by the sheet 4 into a mechanical ultrasonic vibration, which is transmitted to the propagation layer 8 when the sheet 4 and the propagation layer 8 are brought into mutual contact under a sufficient pressure.

The signals from the vibration sensor 6 are amplified by unrepresented amplifiers and then supplied to the signal waveform detector 9 for signal processing, of which result is supplied to the controller 1 for coordinate calculation. A dot matrix display 11, composed for example of a liquid crystal display device, is provided behind the transparent propagation layer 8. By the drive with a display driver 10, the position of the vibration input point is displayed as a dot, which can be observed through the sheet and the propagation layer 8. Naturally the controller 1 may display a desired image, other than the input point, on the display 11.

When the vibration is detected by the vibration sensors and the transmission delay times for the vibration are measured, such delay times are used for calculating the distances between the vibration input point and the vibration sensors, in the same manner as in the first embodiment, and the coordinate of the vibration input point is calculated. The controller 1 determines the position of the dot on the display 11 corresponding to thus calculated coordinate and effects the display.

The above-explained configuration realizes an input device with satisfactory operability, allowing to enter manuscript as with paper and pencil.

The present embodiment utilizes transparent members for the sheet 4 and the propagation layer 8 for obtaining a configuration integrating the input and the output, but such transparent members can be dispensed with in case the device is used as an input device as in the first embodiment. Consequently an opaque polymer film may be employed for such purpose.

As explained in the foregoing, the coordinate input device of the first and second embodiments is to detect the vibration input point or the coordinate input point by measuring the transmission time of the ultrasonic vibration, without employing an exclusive pen that has been indispensable in the conventional method utilizing the ultrasonic vibration and enabling the input of the coordinate with any writing utensil or with a finger. This fact provides an excellent effect of eliminating the cable of the exclusive pen, which has been considered as the vital defect of the conventional device utilizing the ultrasonic wave, and realizing coordinate input means of satisfactory operability.

Also in comparison with the coordinate input devices of the electromagnetic induction method or the electrostatic coupling method, that of the ultrasonic method is comparable in the precision of coordinate calculation and is featured by a lower cost, but cannot be used for the input with a finger as it requires an exclusive pen. On the other hand, the device of the resistive film method accepts the input with a finger but is inferior in the precision of coordinate calculation, thus being inadequate for the purpose requiring a high precision. In consideration of these points, the coordinate input device of the foregoing embodiments has the advantages of both methods, also has a high precision of coordinate calculation and accepts the input with a finger. For this reason the device of the second embodiment can also be utilized as a touch panel (for example employed in the operation panel of the cash dispensers and predominantly utilizing the resistive film method), and the field of application of the coordinate input device utilizing the ultrasonic wave can thus be drastically widened.

The present invention is applicable not only to a system consisting of plural equipment but also to an apparatus consisting of a single equipment. It is naturally applicable also to a case where the present invention is realized by the supply of a program to a system or an apparatus.

As explained in the foregoing, the coordinate input device of the present invention enables the input without an exclusive coordinate designating utensil and realizes highly precise coordinate input.

What is claimed is:

1. A coordinate input device comprising:
   coordinate input means having a plate member for generating a vibration and a vibration transmitting member for transmitting the vibration, the plate member being disposed above the vibration transmitting member so as to form a gap therebetween; and
   calculation means for detecting the vibration at predetermined positions of said vibration transmitting member and for measuring a delay time from generation of the vibration to the detection thereof, thereby calculating the coordinate of a vibration input point,
   wherein the plate member and the vibration transmitting member contact each other at the vibration input point during input of the vibration to the vibration transmitting member.

2. A coordinate input device according to claim 1, wherein said plate member is a plate-shaped piezoelectric member polarized in the direction of thickness.

3. A coordinate input device according to claim 1, wherein said vibration transmitting member is laminated with said plate member across a layer which transmits the vibration in a pressed position therein.

4. A coordinate input device according to claim 2, wherein said vibration transmitting member is laminated with said plate member across a layer which transmits the vibration in a pressed position therein.

5. A coordinate input device according to claim 1, wherein said plate member and said vibration transmitting member are composed of transparent member, and further comprising display means of which display surface is superposed with said vibration transmitting member.

6. A coordinate input device according to claim 2, wherein said plate member and said vibration transmitting member are composed of transparent member, and further comprising display means of which display surface is superposed with said vibration transmitting member.

7. A coordinate input device according to claim 3, wherein said plate member and said vibration transmitting member are composed of transparent member, and further comprising display means of which display surface is superposed with said vibration transmitting member.

8. A coordinate input device according to claim 4, wherein said plate member and said vibration transmitting member are composed of transparent member, and further comprising display means of which display surface is superposed with said vibration transmitting member.

9. A coordinate input device according to claim 1, wherein said plate member is adapted to generate vibration of such frequency that the vibration propagating in said vibration transmitting member constitutes a Lamb wave.

10. A coordinate input device according to claim 2, wherein said plate member is adapted to generate vibration of such frequency that the vibration propagating in said vibration transmitting member constitutes a Lamb wave.

11. A coordinate input device according to claim 3, wherein said plate member is adapted to generate vibration of such frequency that the vibration propagating in said vibration transmitting member constitutes a Lamb wave.

12. A coordinate input device according to claim 4, wherein said plate member is adapted to generate vibration of such frequency that the vibration propagating in said vibration transmitting member constitutes a Lamb wave.

13. A coordinate input device according to claim 5, wherein said plate member is adapted to generate vibration of such frequency that the vibration propagating in said vibration transmitting member constitutes a Lamb wave.

14. A coordinate input device according to claim 6, wherein said plate member is adapted to generate vibration of such frequency that the vibration propagating in said vibration transmitting member constitutes a Lamb wave.

15. A coordinate input device according to claim 7, wherein said plate member is adapted to generate vibration of such frequency that the vibration propagating in said vibration transmitting member constitutes a Lamb wave.

16. A coordinate input device according to claim 8, wherein said plate member is adapted to generate vibration of such frequency that the vibration propagating in said vibration transmitting member constitutes a Lamb wave.

17. A coordinate input device according to claim 1, wherein said plate member is composed of piezoelectric ceramics.

18. A coordinate input device according to claim 2, wherein said plate member is composed of piezoelectric ceramics.

19. A coordinate input device according to claim 3, wherein said plate member is composed of piezoelectric ceramics.

20. A coordinate input device according to claim 4, wherein said plate member is composed of piezoelectric ceramics.

21. A coordinate input device according to claim 5, wherein said plate member is composed of piezoelectric ceramics.

22. A coordinate input device according to claim 6, wherein said plate member is composed of piezoelectric ceramics.

23. A coordinate input device according to claim 7, wherein said plate member is composed of piezoelectric ceramics.

24. A coordinate input device according to claim 8, wherein said plate member is composed of piezoelectric ceramics.

25. A coordinate input device according to claim 9, wherein said plate member is composed of piezoelectric ceramics.

26. A coordinate input device according to claim 10, wherein said plate member is composed of piezoelectric ceramics.

27. A coordinate input device according to claim 11, wherein said plate member is composed of piezoelectric ceramics.

28. A coordinate input device according to claim 12, wherein said plate member is composed of piezoelectric ceramics.

29. A coordinate input device according to claim 13, wherein said plate member is composed of piezoelectric ceramics.

30. A coordinate input device according to claim 14, wherein said plate member is composed of piezoelectric ceramics.

31. A coordinate input device according to claim 15, wherein said plate member is composed of piezoelectric ceramics.

32. A coordinate input device according to claim 16, wherein said plate member is composed of piezoelectric ceramics.

33. A coordinate input device according to claim 5, wherein said plate member is composed of polyvinylidene fluoride.

34. A coordinate input device according to claim 6, wherein said plate member is composed of polyvinylidene fluoride.

35. A coordinate input device according to claim 7, wherein said plate member is composed of polyvinylidene fluoride.

36. A coordinate input device according to claim 8, wherein said plate member is composed of polyvinylidene fluoride.

* * * * *

UNITED STATES PATENT AND TRADEMARK OFFICE
CERTIFICATE OF CORRECTION

PATENT NO. : 5,760,346

DATED : June 2, 1998

INVENTORS : KATSUYUKI KOBAYASHI, et al.

It is certified that error appears in the above-identified patent and that said Letters Patent is hereby corrected as shown below:

<u>In the Drawings:</u>

<u>SHEET 4 OF 7</u>

Fig. 4, "ENVELOP" should read --ENVELOPE--.

<u>COLUMN 6</u>

Line 4, "L=Vp·tp+n·πp" should read --L=Vp·tp+n·λp--;
Line 25, "1/2" should read --±1/2--.

Signed and Sealed this

Second Day of February, 1999

Attest:

Attesting Officer

*Acting Commissioner of Patents and Trademarks*